US007389950B2

(12) United States Patent
Lo

(10) Patent No.: US 7,389,950 B2
(45) Date of Patent: Jun. 24, 2008

(54) SPRINKLER HAVING MOVABLE NOZZLES

(76) Inventor: Sun-Nan Lo, P.O. Box 487, Changhua (TW)

( * ) Notice: Subject to any disclaimer, the term of this patent is extended or adjusted under 35 U.S.C. 154(b) by 0 days.

(21) Appl. No.: 10/916,492

(22) Filed: Aug. 12, 2004

(65) Prior Publication Data

US 2006/0032949 A1 Feb. 16, 2006

(51) Int. Cl.
*B05B 15/00* (2006.01)
*B05B 1/26* (2006.01)
*B05B 1/32* (2006.01)
*A01G 25/06* (2006.01)

(52) U.S. Cl. ........................ 239/542; 239/544; 239/451; 239/380; 239/381; 239/201

(58) Field of Classification Search ................. 239/542, 239/544, 451, 457, 380, 381, 383, 200, 201
See application file for complete search history.

(56) References Cited

U.S. PATENT DOCUMENTS 3,765,446 A * 10/1973 Livingston .................. 137/504
3,872,928 A * 3/1975 Livingston ................... 169/56
3,884,305 A * 5/1975 Livingston ................... 169/37
4,660,766 A * 4/1987 Nelson et al. .......... 239/222.17
4,796,804 A * 1/1989 Weiss ............................ 239/1

* cited by examiner

*Primary Examiner*—Davis Hwu

(57) ABSTRACT

A sprinkler includes hollow tube with a plurality of apertures and a plurality of nozzles are respectively inserted through the apertures. Each nozzle is connected to a bellow which is engaged with the aperture. A guide member is rotatably mounted to the hollow tube and includes a plurality of inclined slots in which the nozzles are movably engaged. The positions of the nozzles are adjusted by rotating the guide member so as to have different patters of watering.

5 Claims, 5 Drawing Sheets

SPRINKLER HAVING MOVABLE NOZZLES

FIELD OF THE INVENTION

The present invention relates to a sprinkler includes a guide member with slots with which nozzles are movably engaged so that the nozzles are moved and adjusted by operating the guide member.

BACKGROUND OF THE INVENTION

A conventional sprinkler generally includes a pipe with a plurality of apertures from which water springs out. The pipe is controlled by a mechanism which includes several gears so as to control the pipe to rotate within a desired angle. However, the gears could be jammed by pebbles or even grass. U.S. Pat. Nos. 5,645,218 and 5,511,727 disclose sprinklers which are involved complicated structure and the manufacturing cost is too high to be accepted in the market.

The present invention intends to provide a sprinkler which includes a plurality of nozzles retained in inclined slots of a guide member which is rotated to change the positions of the nozzles to have different types of watering patterns.

SUMMARY OF THE INVENTION

The present invention relates to sprinkler which comprises a tubular body with a hollow tube and a plurality of apertures are defined in a flat surface of the hollow tube. An elongate strip is connected to an underside of the flat surface and has a plurality of through holes. A plurality of bellows are connected on the elongate strip and each bellow is connected to a nozzle which is in communication with one of the through holes corresponding thereto. The nozzles extend through the apertures and the bellows are engaged with the apertures respectively. A guide member is rotatably mounted to the hollow tube and includes a plurality of inclined slots in which the nozzles movably engaged.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
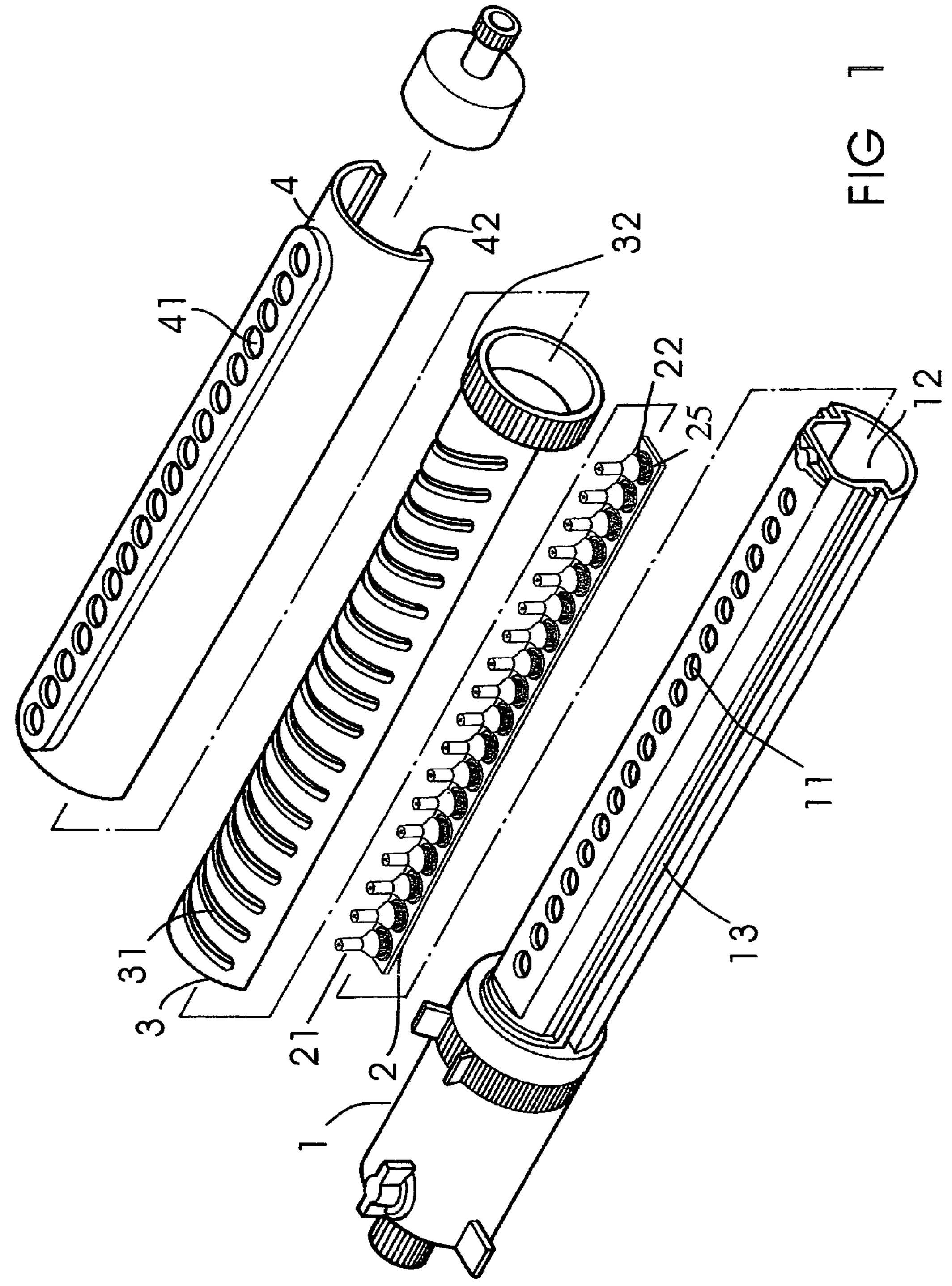
FIG. 1 is an exploded view to show the sprinkler of the present invention.
Figure 2:
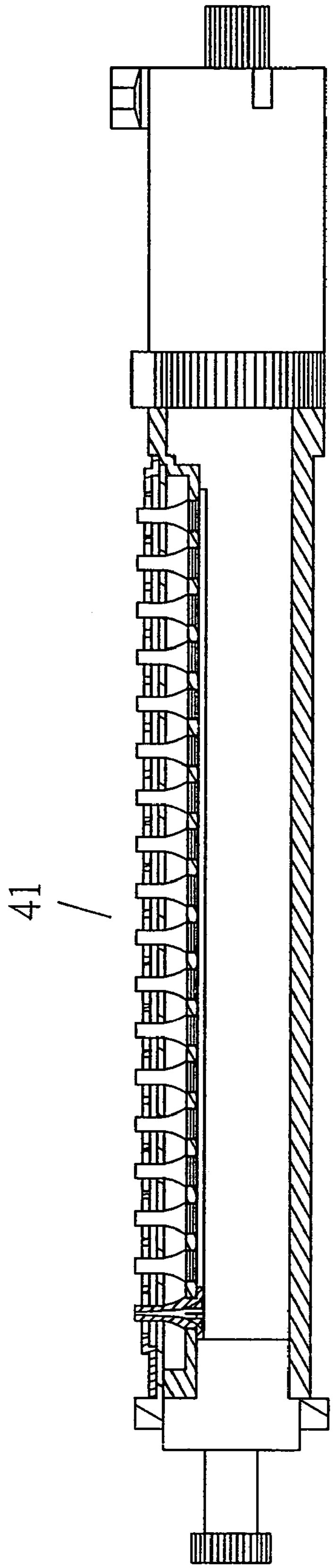
FIG. 2 is a cross sectional view of the sprinkler of the present invention.
Figure 3:
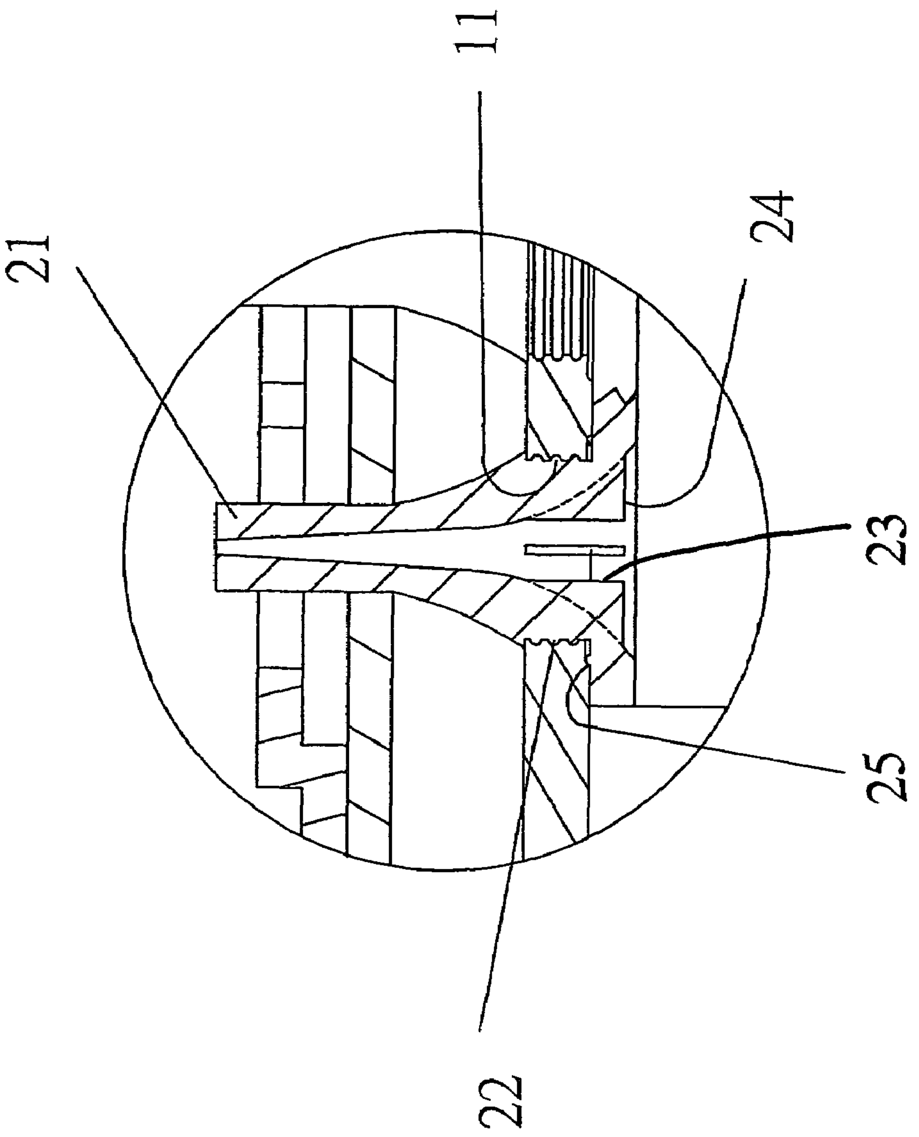
FIG. 3 is an enlarged view to show the connection of the nozzle and the hollow tube, the guide member and the top cover.

Referring to FIGS. 1 to 3, the sprinkler of the present invention comprises a tubular body 1 with a hollow tube 12 and a plurality of apertures 11 are defined in a flat surface of the hollow tube 12. Two grooves 13 are defined in an outer periphery of the hollow tube 12 for connecting a top cover 4 which will be described hereinafter. An elongate strip 2 is connected to an underside of the flat surface of the hollow tube 12 and has a plurality of through holes 23 defined therethrough. A plurality of bellows 22 are connected on the elongate strip 2 and each bellow 22 IS connected to a nozzle 21 which is in communication with one of the through holes 23 corresponding thereto. A plurality of annular sealing flanges 25 extend from the elongate strip 2 and each bellow 22 is enclosed by one of the sealing flanges 25 so as to prevent leakage. The nozzles 21 extend through the apertures 11 and the bellows 22 are engaged with the apertures 11 respectively. A plurality guide stubs 24 extend from an inner periphery of each of the through holes 23 so as to reduce turbulence when the water enters the through holes 23.

A guide member 3 includes a plate with a semi-circular cross section and a ring 32 is connected to an end of the plate. The ring 32 is rotatably mounted to the hollow tube 12 of the body 1 and the plate includes a plurality of inclined slots 31 defined therethrough. The nozzles 21 are movably engaged with the inclined slots 31. Therefore, the directions of the nozzles 21 can be adjusted by rotating the guide member 3.

The top cover 4 has two side flanges 42 which are engaged with the grooves 13 and the top cover 4 includes a plurality openings 41 in which the nozzles 21 are movably received.

Figure 4:
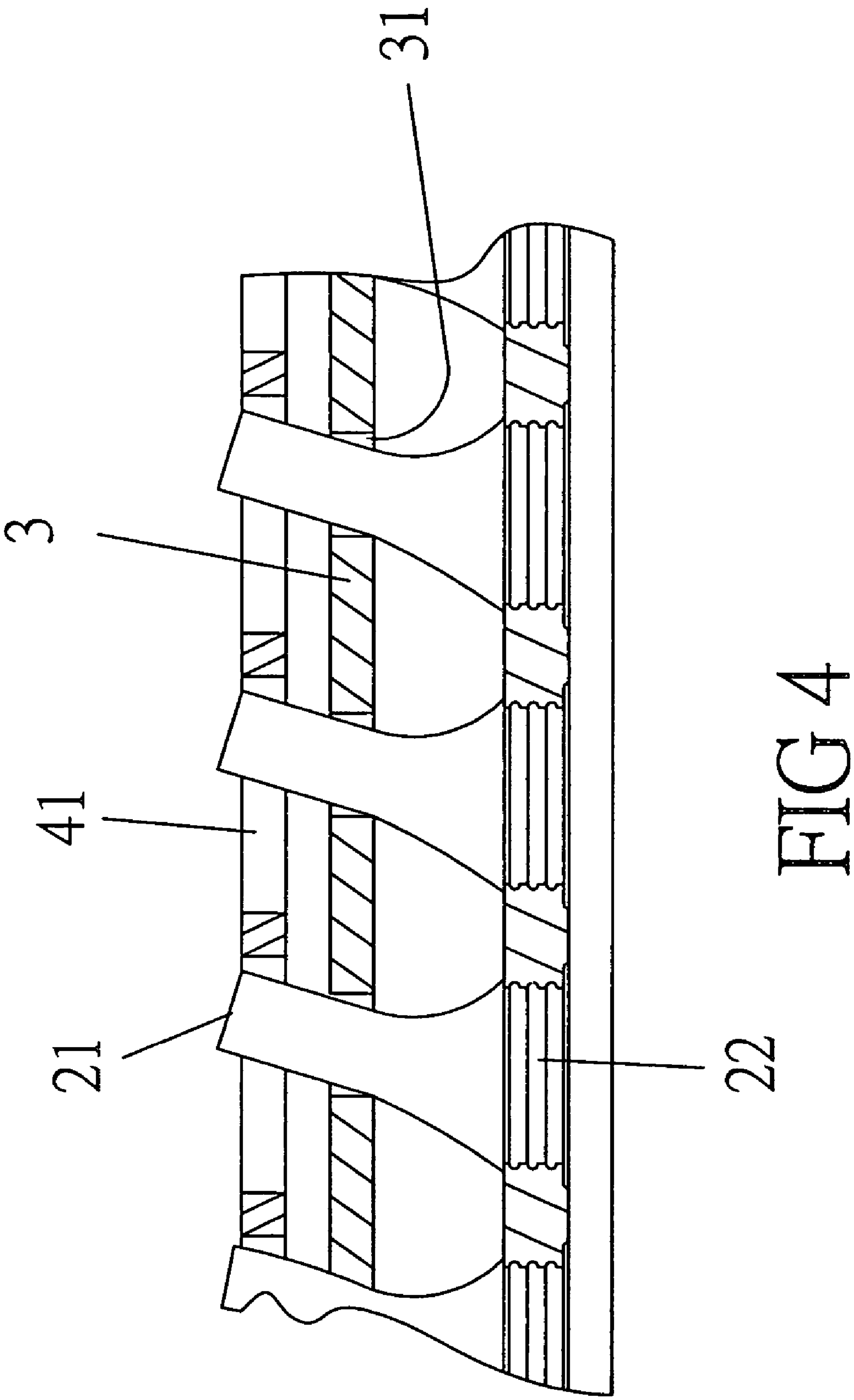
FIG. 4 shows that the nozzles are adjusted by the inclined slots of the guide member.
Figure 5:
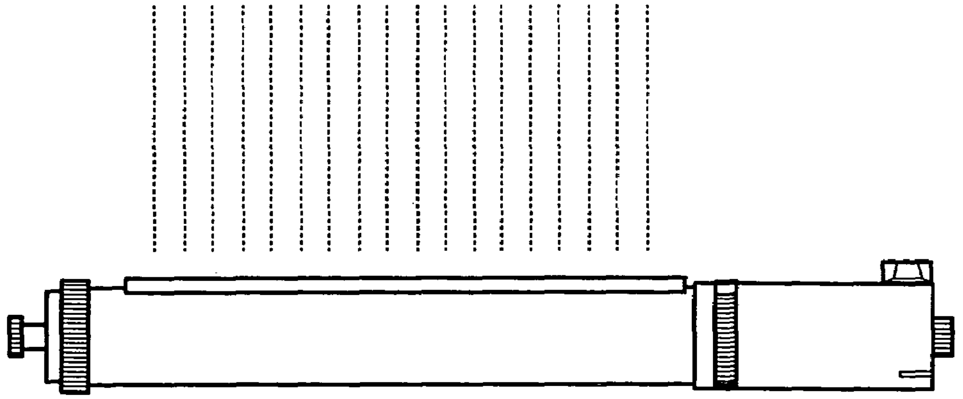
FIGS. 5 to 7 shows different patterns of sprinkling.
Figure 6:
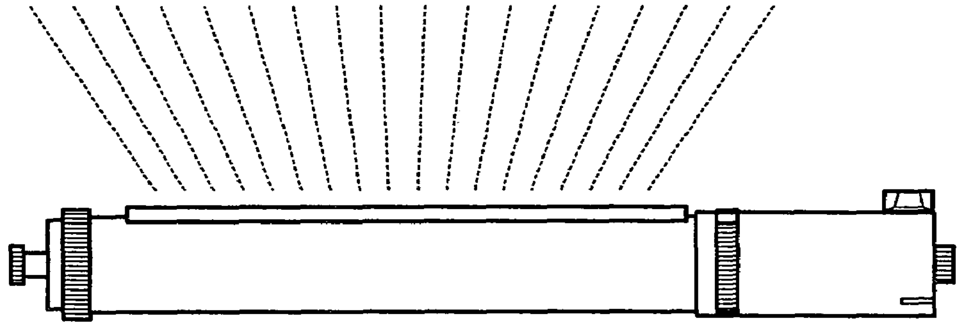
Figure 7:
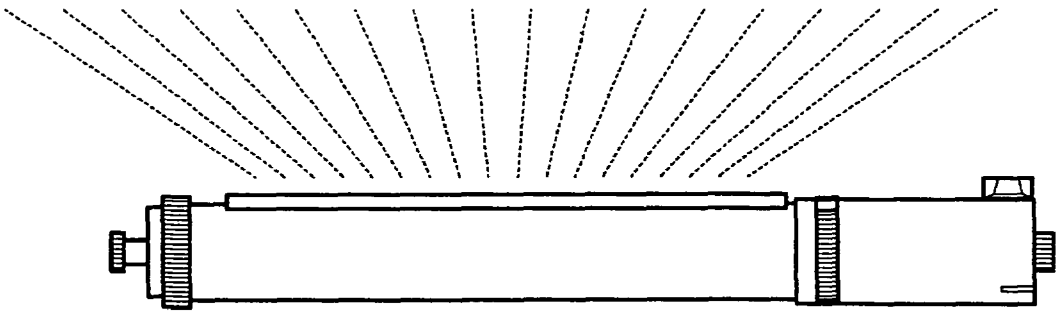

As shown in FIG. 4, the nozzles 21 are moved by the inner periphery defining the inclined slots 31 when the guide member 3 is rotated such that the directions of the nozzles 21 can be adjusted and different patterns of sprinkling can be obtained as shown in FIGS. 5 to 7.

While we have shown and described the embodiment in accordance with the present invention, it should be clear to those skilled in the art that further embodiments may be made without departing from the scope of the present invention.

What is claimed is:

1. A sprinkler comprising:

a tubular body with a hollow tube and a plurality of apertures defined in a flat surface of the hollow tube;

an elongate strip connected to an underside of the flat surface of the hollow tube and having a plurality of through holes defined therethrough, a plurality of bellows connected on the elongate strip and each bellow connected to a nozzle which is in communication with one of the through holes corresponding thereto, the nozzles extending through the apertures and the bellows engaged with the apertures respectively, and a guide member rotatably mounted to the hollow tube and including a plurality of inclined slots defined therethrough, the nozzles movably engaged with the inclined slots.

2. The sprinkler as claimed in claim 1, wherein the hollow tube of the body includes grooves defined in an outer periphery thereof and the a top cover having two side flanges which are engaged with the grooves, the top cover including a plurality openings in which the nozzles are movably received.

3. The sprinkler as claimed in claim 1, wherein the guide member includes a plate with a semi-circular cross section and a ring is connected to an end of the plate, the inclined slots defined through the plate and the ring is rotatably mounted to the hollow tube of the body.

4. The sprinkler as claimed in claim 1 further comprising a plurality guide stubs extending from an inner periphery of each of the through holes.

5. The sprinkler as claimed in claim 1 further comprising a plurality of annular sealing flanges extend from the elongate strip and each bellow is enclosed by one of the sealing flanges.

* * * * *